United States Patent
> Malis

[15] 3,668,967

[45] June 13, 1972

[54] CHORD INDICATOR

[72] Inventor: Albert Malis, 4954 Hazeltine Avenue, Sherman Oaks, Calif. 91403

[22] Filed: July 27, 1970

[21] Appl. No.: 58,390

[52] U.S. Cl.....................................84/471, 84/473, 84/485
[51] Int. Cl.....................................G09b 15/02, G10b 15/00
[58] Field of Search..........................84/470–474, 477–480, 84/482, 485

[56] References Cited

UNITED STATES PATENTS

| | | | |
|---|---|---|---|
| 2,814,231 | 11/1957 | Jones | 84/485 |
| 3,245,303 | 4/1966 | Patt | 84/485 |
| 1,300,193 | 4/1919 | Raff | 84/485 |
| 1,556,147 | 10/1925 | Johnson et al. | 84/485 |
| 2,001,191 | 5/1935 | Golden | 84/485 |
| 3,338,126 | 8/1967 | Wiley et al. | 84/485 |

FOREIGN PATENTS OR APPLICATIONS

| | | | |
|---|---|---|---|
| 1,512,399 | 0/1968 | France | 84/471 |

Primary Examiner—Richard B. Wilkinson
Assistant Examiner—John F. Gonzales
Attorney—Roman A. Di Meo

[57] ABSTRACT

The invention involves an indicator which identifies the various musical chords and displays the location of the notes comprising the various musical chords upon a simulated finger board of a fretted stringed instrument. This is accomplished in the instant invention by providing a sliderule device having a transparent outer member with indicia imprinted thereon, including a replica of a fingerboard and a series of characters which designate the particular tone which is made when a finger is pressed down at that point on the fingerboard. The device further includes first and second slides which carry a plurality of spots along the length thereof. By manipulation of the slides, and thier associated indexing means, the spots are positioned behind pre-determined characters on the fingerboard to make such characters stand out and be easily read by the viewer. The characters correspond to the notes in the chord selected by the indexing means. In this manner, all the notes included in a preselected chord are identified and located at their respective positions on the simulated fingerboard.

6 Claims, 9 Drawing Figures

INVENTOR
ALBERT MALIS

INVENTOR.
ALBERT MALIS

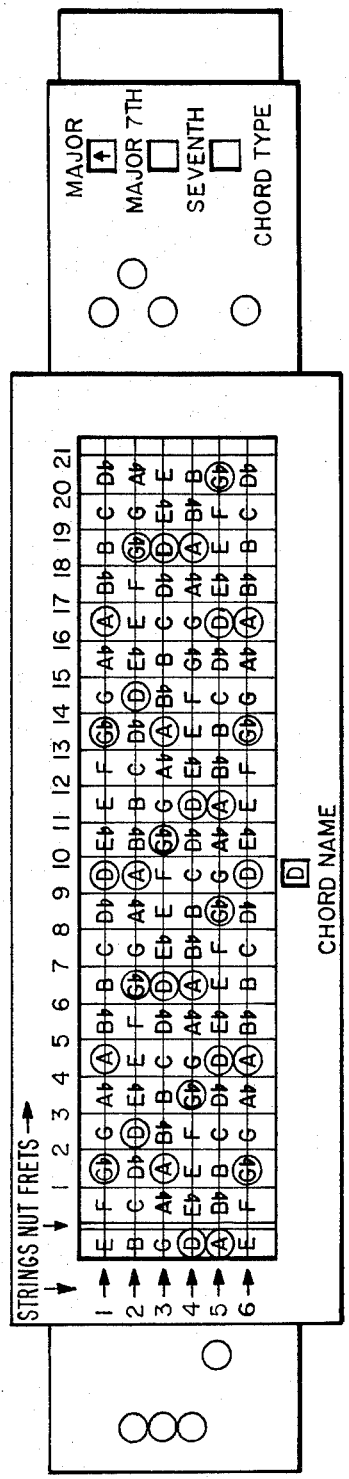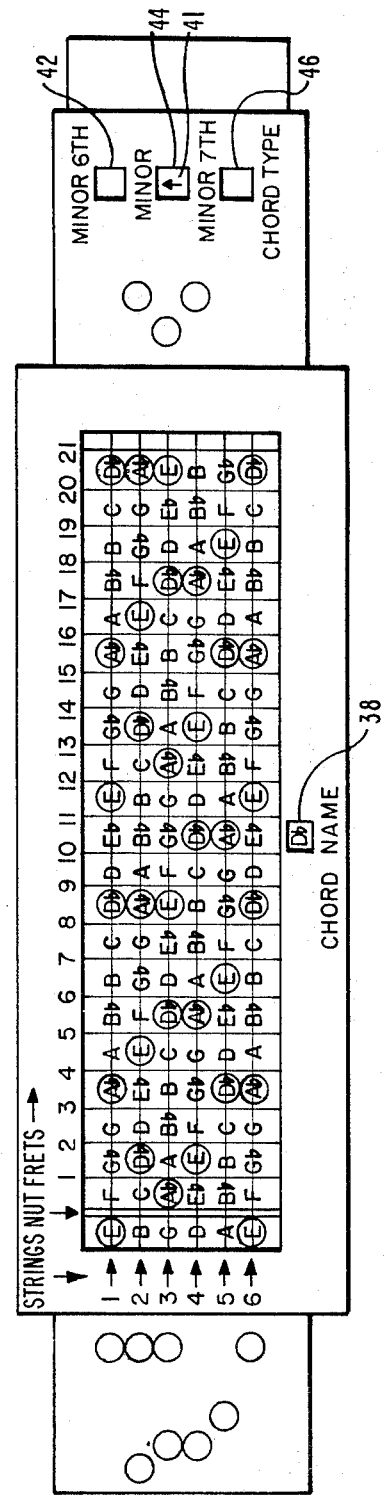

INVENTOR.
ALBERT MALIS

CHORD INDICATOR

BACKGROUND OF THE INVENTION

1. Field of the Invention

The invention is directed to the art of chord identification, selection and finger-position locating devices for musical instruments.

2. Description of the Prior Art

There are literally thousands upon thousands of various chords for musical instruments. The sheer volume of such chords confuses the new student of music as well as his older, more experienced, musical brothers. Musicians, and especially new students have a difficulty in remembering not only the specific notes which constitute a particular chord, or chord type, but have especial difficulty in locating the particular notes of the chord on a fingerboard. Although most chords contain only three or four notes, it can be appreciated that each of these particular notes recurs several times on the fingerboard. That is to say, the same particular note can be obtained by pressing one finger on a plurality of locations on any one of a plurality of strings on a fingerboard. This is true for each of the notes of the chord. Inasmuch as there are four fingers which are used to depress the strings at specific locations along the length, and inasmuch as these fingers have only a limited, discrete area of the fingerboard upon which they can jointly operate in a given period of operation, it becomes very important for one to not only readily identify the notes making up a particular chord, but also to readily visualize the location of such notes on a fingerboard. Obviously, such limitations of the spacing of the fingers on one's hand dictates the selection by a musician of notes in a chord having a close spacial relationship.

A musician can, of course, memorize the various chords and the combinations of notes which constitute same. Likewise, he can also commit to memory the specific location of each note on a fingerboard, and, by extension, the location of each grouping of notes which make up a particular chord, to thereby enable him to cope with the spacial limitations of his playing hand in moving from one chord to another and especially in playing chord melody. However, such a method of committing chord make-up and locations to memory is very time consuming and tends to discourage novice musicians. It is accordingly desireable to employ an instructional device capable of being utilized by a novice musician to learn chord make-up and location or capable of being employed by a music instructor to aid his students in the accomplishment of same.

Attempts have heretofore been made with a view to providing such a device, but none have heretofore overcome the objections of inherent complexity of construction and operation. For example, U. S. Pat. No. 2,001,191 entitled "Chord Finder for Tenor Banjos," which issued on May 14, 1935, to Roy Lee Golden, attempts to satisfy the aforesaid need by providing a chord finder which enables one to locate all the possible combinations of finger positions for playing the major, minor triad or dominant seventh chords on the same note as a root without altering or adjusting the device, once the desired key is selected. The key selected can be varied, and all finger positions will likewise be varied. Golden does present a partial solution to the problem but fails in several important respects. Firstly, his device is self-limiting; i.e., only three specific chords can be displayed. Secondly, the device is inherently clumsy and bulky, since each chord presentation must necessarily have a separate, simulated fingerboard, Ideally, compactness would dictate the use of a limited (preferably single) number of fingerboards to present a plurality of chords. Applicant's invention overcomes these and other limitations in the Golden device.

A second approach in the prior art to solution of the problem is set forth in U. S. Pat. No. 2,814,213 entitled "Changeable Chord Finder," which issued to V. L. Jones on Nov. 26, 1967. The Jones device does meet the objection noted above with respect to Golden regarding the plurality of fingerboards, but accomplishes this by introducing a plurality of discrete, separate slide members, which, in operation, are clumsy and complex in and of themselves. Furthermore, Jones fails to provide a device which simultaneously presents to the viewer the identification of all the notes in a preselected chord with the location of all such notes indicated on the fingerboard, while visually identifying all those notes not included in the preselected chord. Applicant's invention likewise overcomes these and still other limitations of the Jones device.

A third approach to solving the subject problem hereinabove set forth is the publication of various books which both set forth in tabular form the various notes which constitute the various chords and also present, in chart form, the location of various chords along the fingerboard. The limitations of this approach are obvious, and include the difficulty of turning pages when wanting to locate various chords or in changing finger positions in a single chord. Furthermore, chord books show many positions for the various chords but don't show a direct viewing relationship to the melody notes which quite often are not included in the chord notes. Applicant's device also overcomes these objectives, all as shall hereinafter be more fully set forth and described.

SUMMARY OF THE INVENTION

Applicant's invention is a chord indicator which generally is constructed along the lines of a sliderule. It includes an outer member having a transparent area with both a replica of a fingerboard of, for example, a guitar, and a plurality of notes imprinted thereon at all finger positions, the notes depicted correspond to the notes which would be played if the fingers were pressed on such notes as serve to identify the respective finger positions. A first slide is positioned within the outer member, and a second slide is located under the first slide. The surface of each slide is of a coloring which does not significantly contrast with the color of the imprinting contained on the transparent area of the outer member. The slides each contain a number of spots of a coloring which does significantly contrast with the aforesaid imprinting. The spots are placed at predetermined locations along the length of each slide and are designed to underlie only a single note. The first slide member also contains a plurality of apertures located at predetermined locations along its length. An indexing window is provided in the outer member which cooperates with the first slide to enable selection of a particular chord name or key. A set of indexing windows are provided in the first slide which cooperates with the second slide to enable selection of a particular chord type. To operate the chord indicator, the indexing windows are set to select a specific chord and a chord type, thereby automatically moving the spots on the first and second slides behind a member of notes imprinted on the fingerboard. Ergo, all the notes constituting the specific chord type in the selected chord name are simultaneously identified and their location relative to the notes not in the selected chord are also displayed on the fingerboard. The indicator is simple to operate and consists of only three components. Various chords and chord types are presented on a single fingerboard, and all notes and chord finger positions are simultaneously presented. One can readily change the name and chord types merely by a minor manipulation of the indexing windows.

BRIEF DESCRIPTION OF THE DRAWINGS

FIG. 5 is a front elevation view of the indicator with the slides being pre-positioned to define all notes appearing in a D Major chord.

FIG. 6 is a rear elevation view of the indicator with the slides being pre-positioned to define all notes appearing in a D♭ Minor chord.

DESCRIPTION OF THE PREFERRED EMBODIMENT

Figure 2:
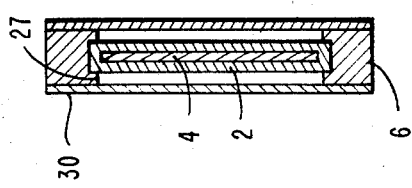
FIG. 2 is a cross-sectioned view taken along lines 2—2 of FIG. 1.
Figure 3:
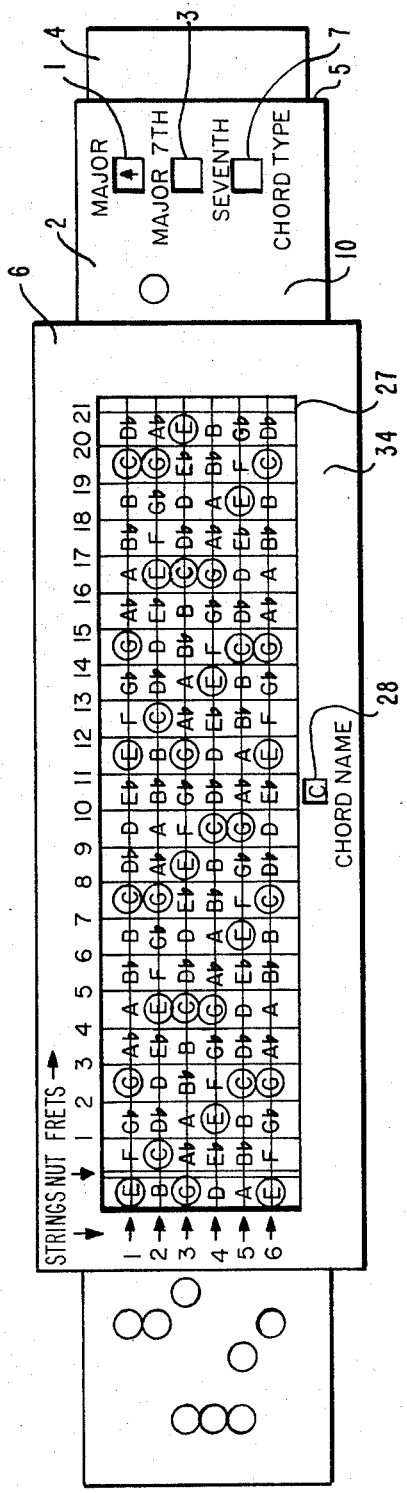
FIG. 3 is a front elevation view of the indicator with the slides being pre-positioned to define all notes appearing in a C Major chord.

Referring to FIG. 3, applicant's invention is generally comprised of a first elongated slide 2, a second elongated slide 4 carried within slide 2, and an outer elongated indicator 6 which is adapted to slideably receive and contain slides 2 and 4. Slide 2 is an elongated sleeve which surrounds slide 4, and indicator 6 is also an elongated sleeve which surrounds slide 4, as can be clearly seen in FIG. 2.

Slides 2 and 4 as well as indicator 6 can be manufactured from any suitable rigid or semi-rigid construction materials, such as wood, metal, stiff cardboard, plastic, etc. The relative tolerances between the respective slides and indicator should be sufficient to insure a friction-fit, and should allow relative ease of movement.

Figure 1:
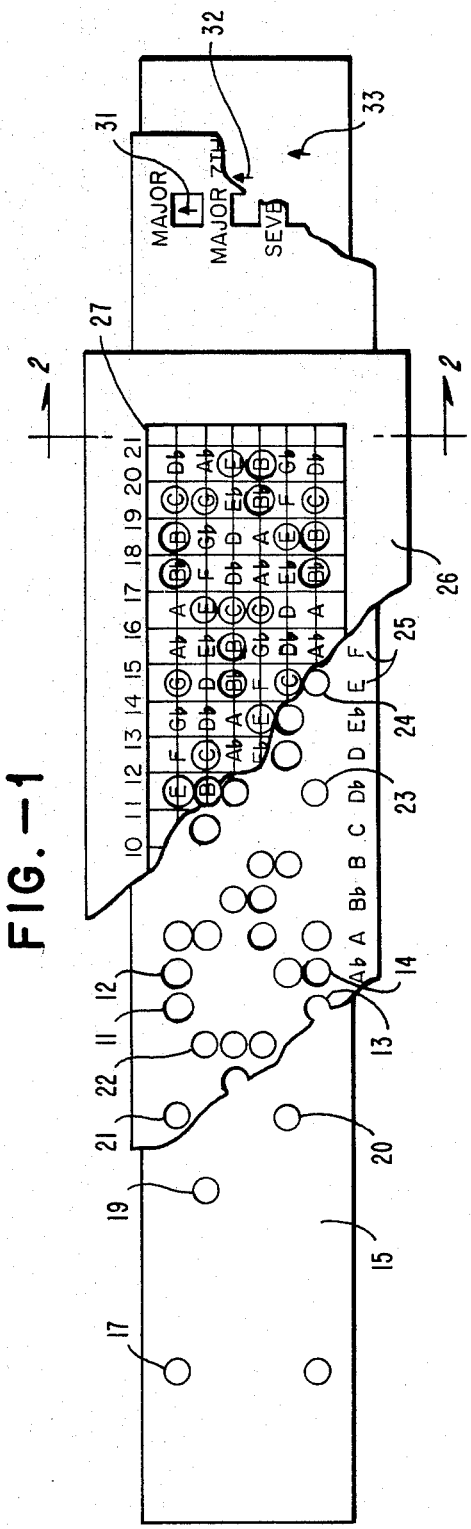
FIG. 1 is an enlarged front elevation view of the indicator with cut-away portions of the cover member and the first slide member.

Slide 4 essentially consists of an elongated, flat member of a substantially rectangular cross-section. The surface of slide 4 is painted a first color. A plurality of spots, such as spots 17, 18, 19 and 20 as shown in FIG. 1 and a plurality of arrows 31, 32 and 33 also as shown in FIG. 1 are painted on the front surface of slide 4 at pre-determined locations and in a second color, which color contrasts with said first color. The spots are of a size such as is necessary to highlight a single character (as hereinafter described).

Slide 2 likewise essentially consists of an elongated flat member of a substantially rectangular cross-section. Slide 2 has a rectangular opening extending lengthwise therethrough of a size which corresponds substantially to the cross-sectional dimensions of slide 4. Slide 2 is adapted to slideably receive and contain slide 4 in said rectangular opening. Slide 2 is of a shorter length than slide 4.

Slide 2 has a series of indexing windows 1, 3 and 7 extending completely through the front face 10 at a location near the right end 5 thereof. without deviating from the scope of the invention herein, it is understood that although the indexing windows, 1, 3, and 7, and corresponding chord type identification means are shown as separate viewing means carried by slide 2, they may also consist of a single viewing and indexing window carried by said slide 2 along its lower edge adjacent to the note identifying characters which are also carried by slide 2 as hereinafter mentioned. The index mark selector carried by slide 4 would also be situated in corresponding relationship to the viewing and indexing window of slide 2. Indicator 6 of course would then be provided with a cooperating window means on its face to observe the chord type identification concurrently with the index mark selector. As can be more clearly seen in FIG. 1, the front face 10 of slide 2 also includes a plurality of apertures along its length, such as apertures 11, 12, 13 and 14. Such apertures are substantially equal in size to and are adapted to uncover spots 17, 18 and 19 of slide 4. The front surface of slide 2 is painted said first color. A plurality of spots, such as spots 21, 22, 23 and 24, are painted thereon at predetermined locations and in a said second color. Slide 2 also has imprinted along the lower edge of its front surface a series of characters 25 which represent the various notes in the scale. The characters 25 are imprinted in said second color.

Indicator 6 generally consists of an elongated flat member having a substantially rectangular cross-sectional area extending along its length. Indicator 6 is not quite as long as slide 2. Indicator 6 has a rectangular opening extending lengthwise therethrough, which opening corresponds substantially to the outer cross-section dimension of slide 2. Indicator 6 is adapted to slideably receive and contain slide 2 in said rectangular opening.

The front face 26 of indicator 6 has a rather large window 27 located therein. A transparent cover 30 overlies face 26 and is attached thereto by adhesive or other suitable means. A second window 28 is provided in the face 26 of indicator 6 approximately mid-way along its length and close to the lower edge thereof. The surface 34 of indicator 6 is painted in said second color. The transparent cover 30 has imprinted therein in said first color various indicia, as hereinafter set forth. First of all, the cover 30 has a replica of a stringed instrument fingerboard imprinted thereon, including spaced parallel, longitudinally extending lines, each representing strings 1–6, and horizontally extending, longitudinally spaced, parallel lines 1–21 which serve to represent frets. To the left of fret 1 is provided a line representing the nut of the finger board. Immediately to the left of the nut are imprinted, in a transversely extending manner, the characters E, B, G, D, A and E, which have the function of naming the respective strings 1–6. In addition, there are provided similar characters located at the intersection of each horizontal and vertical line (which represent the strings and frets, respectively) which serve to designate the particular tone which is made when the string of the corresponding musical instrument is pressed down by the finger at such intersection of the fret and string. It becomes readily apparent that the simulated fingerboard now presents all notes which can be played by pressing a finger down at any particular location on the simulated fingerboard. The numbers 1–6 are imprinted in said first color in vertical fashion near the left edge of indicator 6 and next to the simulated string lines to identify the respective strings. Likewise, the numbers 1–21 are imprinted in said first color horizontally along the upper edge of indicator 6 and next to the simulated fret lines to identify the respective frets. The respective numerals 1–6 and 1–21 are clearly readible and readily stand out because of the contrast between the first color imprinting and the second color with which face 34 has been painted.

Figure 4:
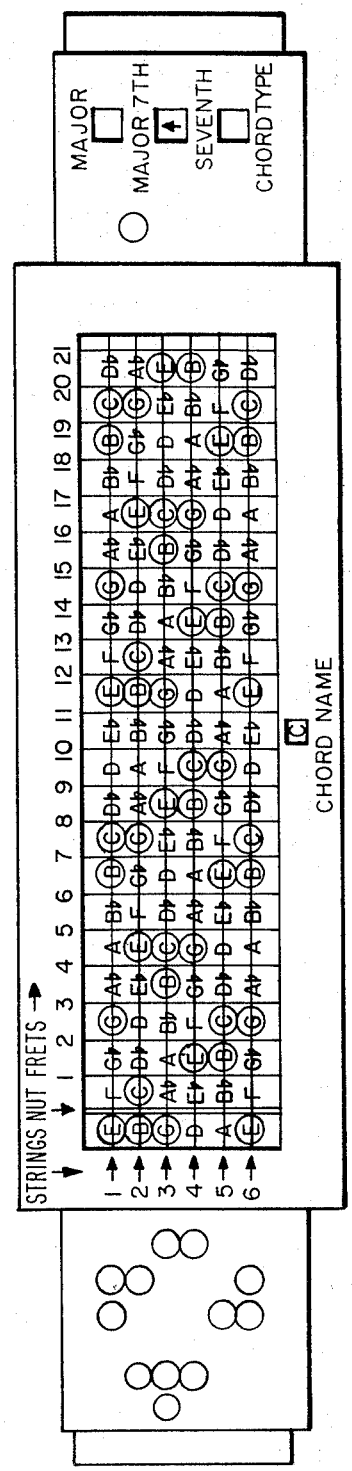
FIG. 4 is a front elevation view of the indicator with the slides being pre-positioned to define all notes appearing in C Major Seventh chord.
Figure 7:
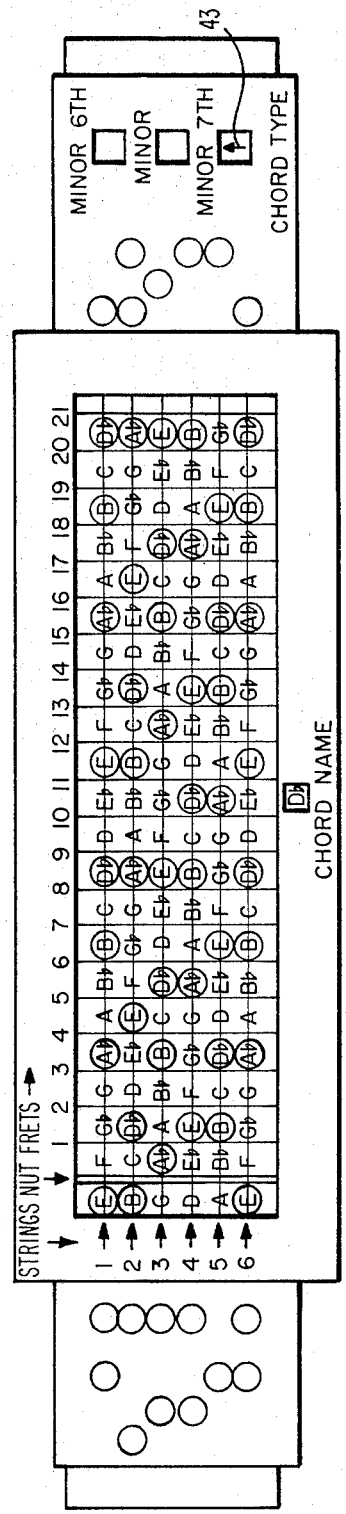
FIG. 7 is a rear elevation view of the indicator with the slides being pre-positioned to define all notes appearing in a D♭ Minor Seventh chord.
Figure 9:
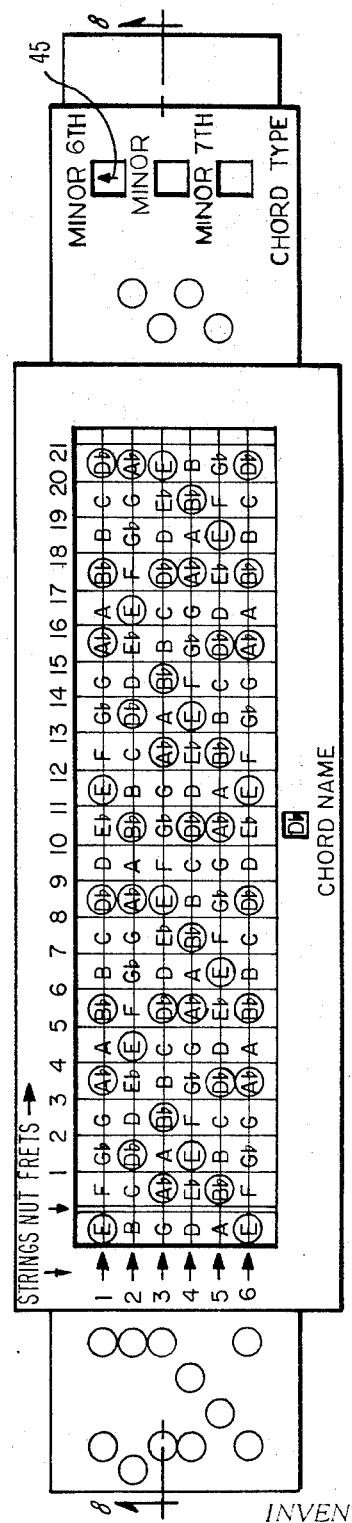
FIG. 9 is a rear elevation view of the indicator with the slides being pre-positioned to define all notes appearing in a D♭ Minor Sixth.

It should be noted that FIGS. 3, 4 and 5 of the drawings shows a front elevation view of a preferred embodiment applicant's invention, all as is above set forth and described. FIGS. 6, 7 and 9 of the drawings show a rear elevation view of such embodiment of applicant's invention. The rear view is substantially identical to the front view as concerns the general layout of the invention. The main difference between the front and back sides of the chord indicator is the identification of the indexing windows on slide 2 and the associated change in location of the spots and the respective interrelationships of same on slides 2 and 4.

The specific location of spots on slides 2 and 4 is quite important. In the specific embodiment of the invention shown, applicant has elected to show only three chord types on the front side of his device; namely, a major, a major seventh, and a seventh. Other and different chord types can be employed, as well as a greater number of chord types, simply by the obvious extension and extrapolation of the inventive concepts shown herein. However, certain basic principles must be applied in the construction of the chord indicator, which principals will hereinafter be enumerated. A basic requirement of construction is to so locate the spots on each slide, such that when a specific chord name and chord type is selected, spots will underlie only those notes on the fingerboard which make up the selected chord name and chord type.

For example, in FIG. 3, a C Major chord has been selected. The notes in a C Major chord are C, E and G. Accordingly, the spacial interrelationship of the spots, characters 25, and arrows 31, 32 and 33 on slide 4 are such that when arrow 31 appears in window 1 and, for example, the key of C appears in window 28, and spots appear under all the notes C, E and G on the fingerboard. Specifically, in the presentation shown in FIG. 3, all spots on slide 2 appear, but no spots on slide 4 show through any of the apertures such as 11 and 12 in slide 2. In the embodiment shown in FIGS. 3, 4 and 5, the Major, Major Seventh and Seventh chord types all have three notes in common; namely, the first third and fifth notes of the major scale.

In FIG. 4, a C Major Seventh chord has been selected and is shown. The change of chord types between FIG. 3 and 4 has been accomplished by moving slide 4 within slide 2 a distance of one fret, thereby removing arrow 31 from window 1 and placing arrow 32 in window 3. Such relative movement serves to place certain spots on slide 4 under apertures such as 12 and 14 in slide 2, thereby causing an additional number of spots to appear under the additional notes on the fingerboard. More specifically, the notes now identified consist of C, E, G and B, which constitute all the notes in the C Major Seventh chord.

In FIG. 5, a D Major chord has been selected. The only change between FIG. 3 and FIG. 5 has been the relative movement between indicator 6 and slide 2 of a distance of two frets, thereby changing from a key of C to a key of D. The spots on slide 2 now underlie all D, G♭ and A notes, which constitute all the notes of a D Major chord. In the representation as shown in FIG. 5, no spots on slide 4 appear through apertures such as 12 and 14 in slide 2.

Although a representation of a D Seventh chord has not been shown, it becomes apparent that such a chord would involve, in addition to the notes D, G♭ and A shown in FIG. 5, a showing of the notes C. This would be accomplished by a relative movement of slides 2 and 4, as shown in FIG. 5, of two frets to the left, thereby allowing the spots on slide 4 to show through the appropriate apertures such as 11 and 13 in slide 2.

FIGS. 6, 7 and 9 are showings of the backside of the chord indicator and provide for the Minor, Minor Seventh and Minor Sixth chord types, respectively. Each of these chord types have three notes in common. For example, in the key of D♭, as shown, each chord type includes the common notes A♭, D♭ and E. Accordingly the characters 25 and spots are so located on slide 2 such that when a particular key such as the key of D♭ is selected, the spots on slide 2 will underlie all the A♭, D♭ and E notes.

When the slide 4 is moved within slide 2 wherein arrow 41 shows through window 44, and slide 2 is moved within indicator 6 such that character D♭ shows through window 38, the indexing means in selecting a Db Minor chord. In this instance, as shown in FIG. 6, only the spots in slide 2 which underlie the notes A♭, D♭ and E are shown, and no spots on slide 4 are uncovered by any apertures in Slide 2.

In FIG. 7, the chord indicator is set to select a D♭ Minor Seventh chord. As in FIG. 6 for the D♭ Minor chord, the spots on slide 2 underlie notes A♭, D♭ and E, but additional relative movement of one fret between slides 2 and 4 allows spots on slide 4 to appear through the apertures provided in slide 2 and so located so as to allow spots to then underlie all notes B. All notes of the D♭ Minor Seventh chord are then presented.

In FIG. 9, the chord indicator is set to select a D♭ Minor Sixth chord. As shown in FIG. 6 for the D♭ Minor chord, the spots on slide 2 again underlie notes A♭, D♭ and E, but the relative movement of slides 2 and 4 one fret position from the position shown in FIG. 6 but in a direction opposite the movement noted in the preceeding paragraph, allows the spots on slide 4 to show through certain apertures provided in slide 2 thereby underlying all notes B♭. All notes in the D♭ Minor Sixth chord are thereby presented.

Figure 8:
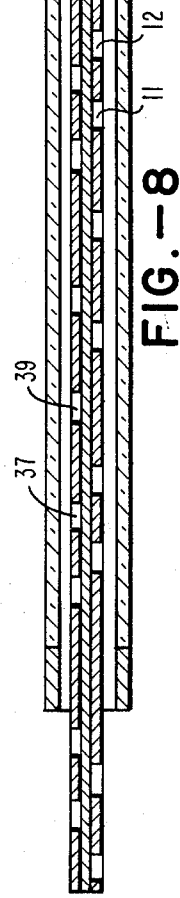
FIG. 8 is a cross-sectional view of the device taken along line 8—8 of FIG. 9.

FIG. 8, which is a sectional view taken along lines 8—8 of FIG. 9, clearly shows the interrelationship of indicator 6 and slides 2 and 4, as well as some of the apertures such as 11, 12, 37 and 39 which are located at pre-determined positions in each row along the length of slide 2, on both the front and rear sides.

The operation of the chord indicator can be readily gleaned from the foregoing description. If one desires to identify all the notes constituting a particular chord name and chord type while simultaneously indicating the location of all finger positions for playing such chord name and chord type, one first of all moves slide 2 within indicator 6 until the desired chord name character 25 appears in window 28. The slide 4 is then moved within slide 2 until an arrow appears in the window of the desired chord type. One then views the simulated fingerboard which will both identify all the notes which make up the selected chord and chord type and also show their respective locations on the fingerboard.

It can be appreciated that the particular embodiment shown is illustrative in nature. Although only three chord types were shown on each of the front and rear sides of the chord indicator, the number of chord types employed can be readily expanded by utilizing the principles of the invention shown and described. The number can also be increased merely by the addition of additional indexing windows, including the arrow indicia on the inner slide rule, and, perhaps, by increasing the number of slides. The particular chords and chord types desired to be shown as well as the number of same, would of course dictate the specific number of spots on the slides as well as the location and number of apertures included in the slides, but this would involve merely a matter of mechanical design.

It is anticpated that the particular color scheme employed would be a matter of choice. It would be beneficial, however, to provide a contrast between the spots and the imprinted notes and fingerboard so one could readily distinguish the notes and their location on the fingerboard when attempting to read the selected chord name and chord type. If desired, the color scheme might include a third color to be used for each spot which corresponds to the key selected, in which event the chord name window and associated indexing window could be dispensed with or maintained for convenience. In relation thereto, it should be noted that the specific indexing and chord name and chord type selection means employed is also merely a matter of mechanical design, it being anticipated that full equivalents of the indexing means shown can be employed without departing from the spirit and scope of the invention.

In the embodiment shown and described above, the printing of the fingerboard and notes appear on the indicator, while the spots appear on one or more of the slides. It should be appreciated that spots could be placed on the indicator, with the fingerboard and notes being placed on one or more of the slides. Furthermore, although a six-stringed instrument fingerboard is shown in the drawings, the invention is meant to include and cover any and all other types of musical instruments which could be covered by and employ the principals of the instant invention. Accordingly, applicant does not desire to be limited by the embodiments of the invention shown herein, but rather to the scope of the appended claims.

What is claimed and desired to be secured by United States Letters Patent is:

1. A device for quick identification of the multiple positions of notes of a musical chord and the corresponding locations thereof on the fingerboard of a musical string instrument comprising:

a first elongated sleeve means having a transparent portion overwhich is superimposed a representation of a fingerboard of a musical string instrument, said sleeve means provided with a window means for indexing a chord name;

a second elongated sleeve means contained in said first sleeve means and in longitudinal slideable engagement therewith, said second sleeve means having a series of chord name characters positioned in cooperative slideable relationship with said window means carried by first said sleeve means, said second sleeve means being provided with an indexing window means for observing index marking means and having corresponding chord type characters adjacent thereto which are positioned in a predetermined relationship with said chord name characters, said second sleeve means being provided with chord element identifying indicia in a predetermined pattern and a plurality of window means dispersed in a predetermined pattern for selective viewing of additional chord element indicia; and a slide means contained in said second sleeve means, said slide means being in longitudinal slideable engagement with said second sleeve means, said slide means being provided with a plurality of chord element indicia positioned in a predetermined pattern for cooperative observation in said window viewing means carried by said second sleeve means, said slide means having an index means in cooperative slideable relationship with said chord type index characters carried by said second sleeve means for selecting a desired chord type.

2. A device as described in claim 1, wherein said first sleeve means is provided with a plurality of opposite sides each having a transparent portion over which a representation of a fingerboard of a musical instrument is superimposed, said second sleeve means is provided with a plurality of opposite sides corresponding in number with the sides of said first sleeve means and each of said sides having positioned thereon the chord name characters, indexing window means and corresponding chord type characters, chord element identifying indicia and window means, and said slide means is provided with a plurality of opposite sides corresponding in number with the sides of said first and second sleeve means and each of said sides having a plurality of the chord element indicia and an index means thereon.

3. A device as described in claim 2, wherein a plurality of musical note characters are positioned on the fingerboard replica provided by the first sleeve means in a predetermined pattern, and the chord element identifying indicia carried by the second sleeve means and the slide means are colored spots.

4. A device as described in claim 3, wherein the chord identifying indicia carried by the second sleeve means are colored so that when the chord identifying indicia carried by the second sleeve means underlie the desired characters of the same note positioned on the fingerboard replica carried by the first sleeve means, the chord element identifying indicia simultaneously underlie the appropriate note characters carried by the first sleeve means to indicate the harmony to said chord identifying indicia and the multiple chord positions thereof.

5. A device as described in claim 4, wherein the chord type characters carried by each side of the second sleeve means are different from the chord type characters of the opposite sides and the chord name characters, the chord type characters and the index means of the slide means are positioned in slideable adjacent relationship and are simultaneously viewable in a single location.

6. A device as described in claim 5, wherein the window means provided by said first and second sleeve means are transparent areas in the face of the sides thereof.

* * * * *